United States Patent
Miura

(10) Patent No.: US 11,047,345 B2
(45) Date of Patent: Jun. 29, 2021

(54) EVAPORATED FUEL PROCESSING DEVICE

(71) Applicant: HAMANAKODENSO CO., LTD., Kosai (JP)

(72) Inventor: Yuuichirou Miura, Kariya (JP)

(73) Assignee: HAMANAKODENSO CO., LTD., Kosai (JP)

(*) Notice: Subject to any disclaimer, the term of this patent is extended or adjusted under 35 U.S.C. 154(b) by 0 days.

(21) Appl. No.: 17/016,523

(22) Filed: Sep. 10, 2020

(65) Prior Publication Data

US 2021/0088007 A1   Mar. 25, 2021

(30) Foreign Application Priority Data

Sep. 23, 2019   (JP) .............................. JP2019-172390

(51) Int. Cl.
*F02M 25/08* (2006.01)
*F02D 41/24* (2006.01)
*F02D 41/00* (2006.01)

(52) U.S. Cl.
CPC ....... *F02M 25/0836* (2013.01); *F02D 41/003* (2013.01); *F02M 25/0854* (2013.01); *F02D 41/2464* (2013.01)

(58) Field of Classification Search
CPC ............ F02M 25/0836; F02M 25/0854; F02D 41/003; F02D 41/2464
USPC .......................................... 123/516, 518–520
See application file for complete search history.

(56) References Cited

U.S. PATENT DOCUMENTS

| | | | |
|---|---|---|---|
| 10,400,688 B2* | 9/2019 | Fukui ................ | F02M 25/0872 |
| 2011/0067487 A1* | 3/2011 | Haag ................ | B60K 15/03504 73/40 |
| 2015/0292447 A1* | 10/2015 | Tagawa ............. | F02M 25/0836 137/198 |
| 2015/0330338 A1* | 11/2015 | Ito ........................ | F02M 25/089 123/520 |
| 2016/0186699 A1* | 6/2016 | Fukui .................. | B60K 15/035 123/520 |
| 2018/0274494 A1* | 9/2018 | Fukui .................... | F02M 25/08 |

FOREIGN PATENT DOCUMENTS

JP           2018-150901           9/2018

* cited by examiner

*Primary Examiner* — Mahmoud Gimie
(74) *Attorney, Agent, or Firm* — Nixon & Vanderhye P.C.

(57) ABSTRACT

An evaporated fuel processing device includes: a canister configured to adsorb fuel evaporated from a fuel tank; a vapor pipe connecting the fuel tank to the canister; a sealing valve provided in the vapor pipe to be driven by an actuator to quantitatively control an opening degree; and a controller. The controller includes: a restoration detector configured to detect that the supply of power from a battery to the controller is restored after the supply of power from the battery to the controller is cut off; and a restoration actuator configured to drive the actuator so that the sealing valve is fully closed or fully opened when the restoration detector detects that the supply of power is restored.

7 Claims, 7 Drawing Sheets

EVAPORATED FUEL PROCESSING DEVICE

CROSS REFERENCE TO RELATED APPLICATION

This application is based on Japanese Patent Application No. 2019-172390 filed on Sep. 23, 2019, the disclosure of which is incorporated herein by reference in its entirety.

TECHNICAL FIELD

The present disclosure relates to an evaporated fuel processing device for a vehicle.

BACKGROUND

In a vehicle having an internal combustion engine, liquid fuel is stored in a fuel tank to be used for the internal combustion engine. The gas in the fuel tank exerts pressure such as vapor pressure of the evaporated fuel according to the temperature. When refueling the fuel tank, it may be desirable not to release the vaporized fuel to the outside. In this case, an evaporated fuel processing device having a canister is used to adsorb evaporated fuel.

SUMMARY

According to an aspect of the present disclosure, an evaporated fuel processing device includes:
a canister configured to adsorb fuel evaporated from a fuel tank in a vehicle having an internal combustion engine and a battery;
a vapor pipe connecting the fuel tank to the canister;
a sealing valve provided in the vapor pipe, the sealing valve being driven by an actuator to quantitatively control an opening degree for opening and closing the vapor pipe; and
a controller including a restoration detector configured to detect that a supply of power from the battery to the controller is restored after the supply of power from the battery to the controller is cut off, and a restoration actuator configured to drive the actuator so that the sealing valve is fully closed or fully opened when the restoration detector detects that the supply of power is restored.

DETAILED DESCRIPTION

Figure 1:
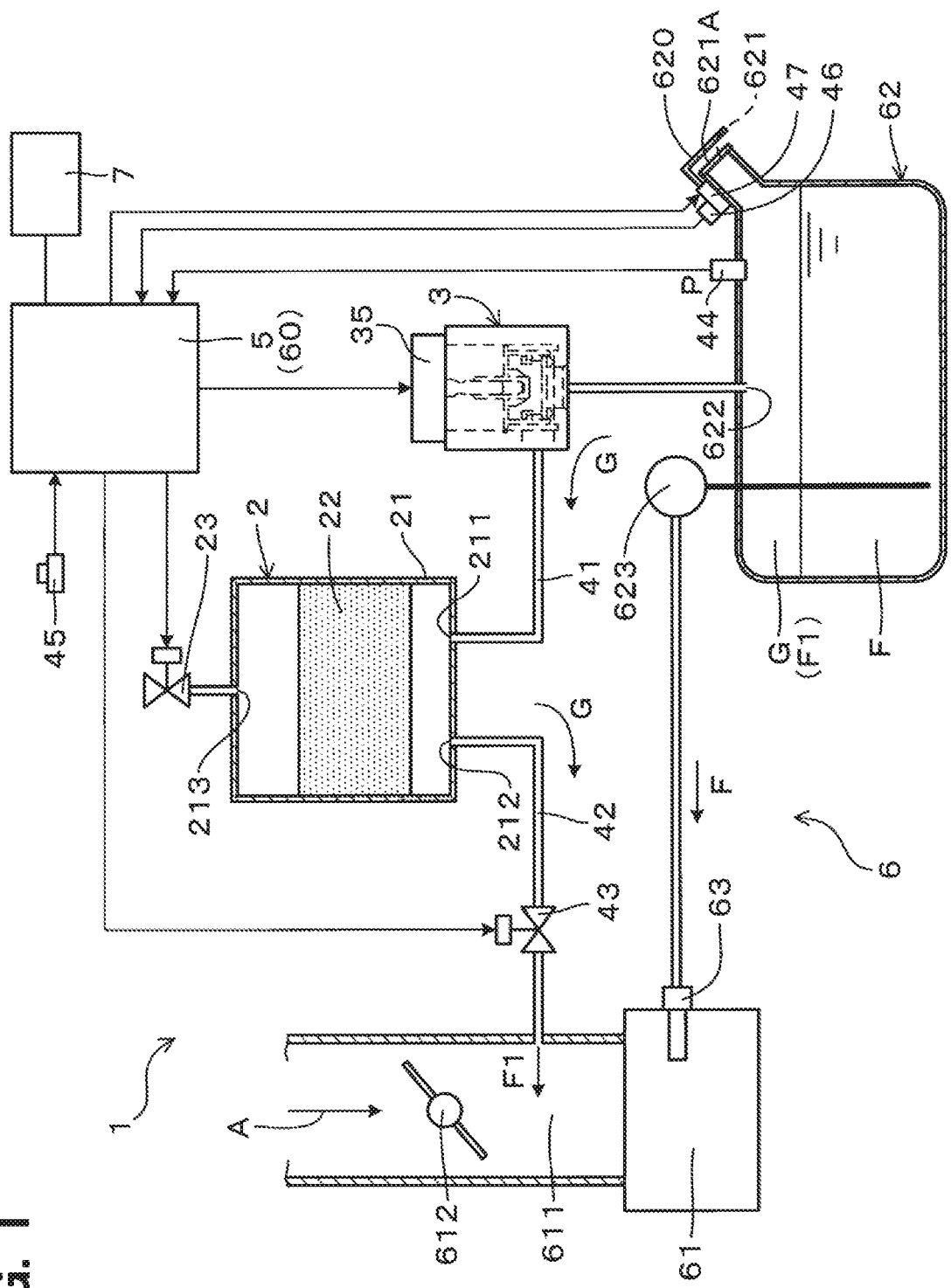
FIG. 1 is an explanatory diagram illustrating an evaporated fuel processing device according to a first embodiment.

In a vehicle having an internal combustion engine, liquid fuel is stored in a fuel tank to be used for the internal combustion engine. The gas in the fuel tank exerts pressure such as vapor pressure of the evaporated fuel according to the temperature. When refueling the fuel tank, it may be desirable not to release the vaporized fuel to the outside. In this case, an evaporated fuel processing device having a canister is used to adsorb evaporated fuel.

Then, before starting fuel supply to the fuel tank, a sealing valve provided in a vapor pipe connecting the fuel tank to the canister is opened to adsorb the fuel vapor in the fuel tank into the adsorbent of the canister. The fuel adsorbed by the adsorbent of the canister is supplied into the intake pipe of the internal combustion engine and is used for combustion in the internal combustion engine. Further, the evaporated fuel in the fuel tank may be supplied to the intake pipe of the internal combustion engine by bypassing the canister.

The sealing valve used in the evaporated fuel processing device is a normally closed valve that normally closes the vapor pipe connecting the fuel tank to the canister. When a signal is sent from a controller to the actuator of the sealing valve, the vapor pipe is opened by the sealing valve. When the sealing valve opens/closes the vapor pipe, the opening degree may be not adjusted, or is adjusted quantitatively or by several levels (such as two levels).

In case where an opening degree of a sealing valve is controlled quantitatively by using a stepping motor in an evaporated fuel processing device, the flow rate of gas flowing through the purge pipe from the fuel tank to the canister can be adjusted by changing a stroke amount of the sealing valve when the fuel tank is depressurized. Further, when the voltage that can be supplied from the power supply to the sealing valve is less than a predetermined value, which is set higher than the minimum drive voltage for driving the sealing valve, the controller of the evaporated fuel processing device controls the sealing valve to close the vapor pipe. This restricts the sealing valve from being left open due to a lowering in the voltage.

The sealing valve is closed when the voltage of the power supply is lowered in the evaporated fuel processing device. The power supply from the power source to the controller is cut off due to abnormality in the power system including the power source and the wiring from the power source to the controller. The present disclosure addresses how to control the sealing valve when the supply of power to the controller is restored after the power supply from the power source to the controller is cut off.

The present disclosure provides an evaporated fuel processing device that can appropriately operate a sealing valve after the supply of electric power from a battery to a controller is cut off.

According to a first aspect of the present disclosure, an evaporated fuel processing device includes:
a canister configured to adsorb fuel evaporated from a fuel tank in a vehicle having an internal combustion engine and a battery;
a vapor pipe connecting the fuel tank to the canister;
a sealing valve provided in the vapor pipe, the sealing valve being driven by an actuator to quantitatively control an opening degree for opening and closing the vapor pipe; and a controller including a restoration detector configured to detect that a supply of power from the battery to the controller is restored after the supply of power from the battery to the controller is cut off, and a restoration actuator configured to drive the actuator so that the sealing valve is fully closed or fully opened when the restoration detector detects that the supply of power is restored.

According to a second aspect of the present disclosure, an evaporated fuel processing device includes:

a canister configured to adsorb fuel evaporated from a fuel tank in a vehicle having an internal combustion engine and a battery;

a vapor pipe connecting the fuel tank to the canister;

a sealing valve provided in the vapor pipe, the sealing valve being driven by an actuator to quantitatively control an opening degree for opening and closing the vapor pipe;

a lid sensor configured to detect an open/close state of a fuel lid of the fuel tank; and a controller including a restoration detector configured to detect that a supply of power from the battery to the controller is restored after the supply of power from the battery to the controller is cut off, and a restoration actuator configured to drive the actuator so that the opening degree of the sealing valve is controlled or maintained when the restoration detector detects that the supply of power is restored.

The restoration actuator is configured to transmit a command representing a total amount of the opening degree to change the sealing valve between a fully closed position and a fully opened position.

The restoration actuator is configured to transmit the command to the actuator to open the sealing valve or maintain the opening degree of the sealing valve, when the restoration detector detects that the supply of the power is restored and the lid sensor detects that the fuel lid is open.

The restoration actuator is configured to transmit the command to the actuator to close the sealing valve, when the restoration detector detects that the supply of the power is restored and the lid sensor detects that the fuel lid is closed.

According to a third aspect of the present disclosure, an evaporated fuel processing device includes:

a canister configured to adsorb fuel evaporated from a fuel tank in a vehicle having an internal combustion engine and a battery;

a vapor pipe connecting the fuel tank to the canister;

a sealing valve provided in the vapor pipe, the sealing valve being driven by an actuator to quantitatively control an opening degree for opening and closing the vapor pipe;

a lid sensor configured to detect an open/close state of a fuel lid of the fuel tank; and a controller including a restoration detector configured to detect that a supply of power from the battery to the controller is restored after the supply of power from the battery to the controller is cut off, and a restoration actuator configured to drive the actuator so that the opening degree of the sealing valve is controlled or maintained when the restoration detector detects that the supply of power is restored.

The restoration actuator is configured to receive information from an electronic control unit of the vehicle whether or not a speed of the vehicle is higher than or equal to a specified value.

The restoration actuator is configured to transmit a command representing a total amount of the opening degree to change the sealing valve between a fully closed position and a fully opened position.

The restoration actuator is configured to transmit the command to the actuator to open the sealing valve or maintain the opening degree of the sealing valve, when the restoration detector detects that the supply of the power is restored, when the lid sensor detects that the fuel lid is open, and when the speed of the vehicle is lower than the specified value.

The restoration actuator is configured to transmit the command to the actuator to close the sealing valve, when the restoration detector detects that the supply of the power is restored, when the lid sensor detects that the fuel lid is open, and when the speed of the vehicle is higher than or equal to the specified value.

The restoration actuator is configured to transmit the command to the actuator to close the sealing valve, when the restoration detector detects that the supply of the power is restored, and the lid sensor detects that the fuel lid is closed.

The evaporated fuel processing device of the first aspect can deal with abnormalities in a power system including a battery and a wiring from the battery to the controller, when using an electric sealing valve that is driven by an actuator and does not have a function of detecting the opening degree.

The electric sealing valve adjusts the opening degree in response to a command input to the actuator, but does not have a function of feeding back the opening degree. Therefore, when the electric power is not supplied from the battery to the controller, the opening degree of the sealing valve is unknown.

The controller has a restoration detector and a restoration actuator. When the restoration detector detects that the power supply is restored after the power supply is cut off, the restoration actuator drives the actuator to cause the sealing valve to be fully closed or fully open. With this configuration, the sealing valve can be set to the fully closed or opened reference position when the electric power is restored after an abnormality such as failure of the battery itself, disconnection of a fuse of the battery, disconnection of a cable from the battery to the controller, disconnection of a connector of the cable to stop the supply of power from the battery to the controller. After the sealing valve reaches the fully closed or opened reference position, the sealing valve can be appropriately adjusted to have a required opening degree.

Therefore, according to the evaporated fuel processing device of the first aspect, it is possible to properly operate the sealing valve after the supply of electric power from the battery to the controller is cut off.

The evaporated fuel processing device of the second aspect can deal with abnormalities in a power system, when an electric sealing valve and a lid sensor are used. In this case, when the restoration detector detects that the power supply is restored and the lid sensor detects that the fuel lid is open, it is determined that fuel is being supplied to the fuel tank when the power is cut off. At this time, the restoration actuator fully opens the sealing valve or maintains the opening degree of the sealing valve. Thereby, the evaporated fuel in the fuel tank can be discharged to the canister.

When the restoration detector detects that the power supply is restored and the lid sensor detects that the fuel lid is closed, the sealing valve is returned to the fully closed reference position to seal the fuel tank. After the sealing valve returns to the fully closed or opened reference position, the sealing valve can be appropriately adjusted to have a required opening degree.

Therefore, also with the evaporated fuel processing device of the second aspect, the sealing valve can be properly operated after the supply of the electric power from the battery to the controller is cut off.

The evaporated fuel processing device of the third aspect can deal with abnormalities in a power system, when an electric sealing valve, a lid sensor and a vehicle speed are used. In this case, when the restoration detector detects that the power supply is restored, when the lid sensor detects that the fuel lid is open and when the vehicle speed is less than the specified value, it is determined that the fuel tank is being refueled while the power is shut off and that the fuel lid is closed. At this time, the restoration actuator fully opens the sealing valve or maintains the opening degree of the sealing valve. Thereby, the evaporated fuel in the fuel tank can be discharged to the canister.

When the vehicle speed is equal to or higher than the specified value while the lid sensor detects that the fuel lid is open, the sealing valve can be returned to the fully closed reference position to keep the fuel tank in the sealed state. When the restoration detector detects that the power supply is restored and the lid sensor detects that the fuel lid is closed, the sealing valve is returned to the fully closed reference position to seal the fuel tank. After the sealing valve returns to the fully closed or opened reference position, the sealing valve can be appropriately adjusted to have a required opening degree.

Therefore, also with the evaporated fuel processing device of the third aspect, the sealing valve can be properly operated after the supply of electric power from the battery to the controller is cut off.

Embodiments will be described with reference to the drawings.

First Embodiment

As shown in FIG. 1, the evaporated fuel processing device 1 of the present embodiment is provided in a vehicle 6 having an internal combustion engine 61 and a fuel tank 62. The evaporated fuel processing device 1 has a canister 2 that adsorbs an evaporated fuel F1 which is fuel F evaporated in the fuel tank 62, a vapor pipe 41 that connects the fuel tank 62 to the canister 2, and a sealing valve 3 provided in the vapor pipe 41. The controller 5 of the evaporated fuel processing device 1 controls opening/closing operation of the sealing valve 3.

Figure 2:
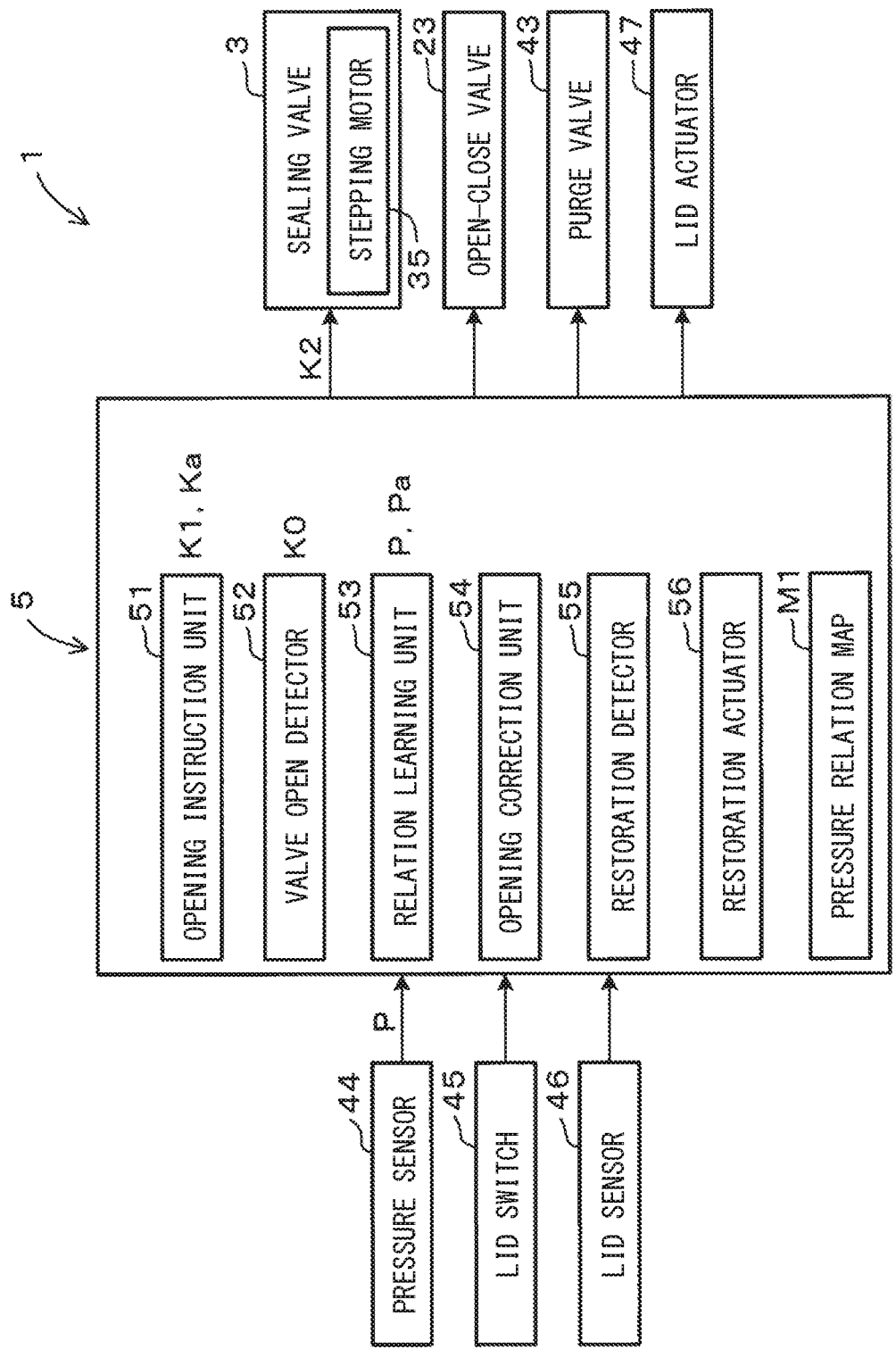
FIG. 2 is an explanatory diagram schematically illustrating a controller of the evaporated fuel processing device according to the first embodiment.

As shown in FIG. 2, the sealing valve 3 is driven by a stepping motor 35 as an actuator, and the opening degree of the sealing valve 3 for opening/closing the vapor pipe 41 can be quantitatively adjusted. The controller 5 includes a restoration detector 55 and a restoration actuator 56. The restoration detector 55 is configured to detect that the supply of power from the battery 7 (power supply) to the controller 5 is restored after the supply of power from the battery 7 to the controller 5 is cut off. The restoration actuator 56 is configured to drive the stepping motor 35 so that the sealing valve 3 is fully closed when the restoration detector 55 detects that the supply of power is restored.

Hereinafter, the controller 5 of the evaporated fuel processing device 1 of the present embodiment will be described in detail.

As shown in FIG. 1, the evaporated fuel processing device 1 is used not to release the evaporated fuel F1, which is a part of the gas G in the fuel tank 62, into atmosphere when fuel is supplied into the fuel tank 62 in the vehicle 6. The evaporated fuel F1 in the fuel tank 62 is stored in the canister 2 and then discharged to the intake pipe 611 of the internal combustion engine 61, or is discharged to the intake pipe 611 of the internal combustion engine 61 by bypassing the canister 2. The fuel component of the evaporated fuel F1 is used for combustion in the internal combustion engine 61.

The flow rate of air A supplied from the intake pipe 611 to the internal combustion engine 61 for combustion is adjusted by a throttle valve 612 disposed in the intake pipe 611. The internal combustion engine 61 has a fuel injection device 63 that injects the fuel F supplied from the fuel tank 62.

As shown in FIG. 1, the fuel tank 62 stores the fuel F used for the combustion in the internal combustion engine 61. The fuel tank 62 has a fuel supply port 621, a purge port 622, and a fuel pump 623. The fuel supply port 621 is used to receive the fuel F supplied to the fuel tank 62 from outside. The purge port 622 is connected to the vapor pipe 41. The fuel pump 623 is used when supplying the fuel F to the fuel injection device 63 of the internal combustion engine 61. The fuel pump 623 supplies the fuel F in liquid phase from the fuel tank 62 to the fuel injection device 63.

A fuel cap 621A is disposed on the fuel supply port 621, and closes the fuel supply port 621 during normal time. The fuel cap 621A is removed during refueling to open the fuel supply port 621. The vehicle 6 is provided with a fuel lid 620 that covers the fuel cap 621A during normal time. The fuel lid 620 enables the operation of removing/attaching the fuel cap 621A during refueling. The fuel tank 62 is provided with a lid actuator 47 for moving the fuel lid 620 to enable operation of the fuel cap 621A, and a pressure sensor 44 for detecting the pressure P in the fuel tank 62. A full tank valve (not shown) is arranged in the fuel tank 62 for sensing the pressure P of the gas G to stop the refueling by the refueling nozzle.

As shown in FIG. 1, a battery 7 is arranged in an engine room of the vehicle 6 as a DC power supply used for an electric system in the vehicle 6. The battery 7 has a DC voltage of 12V, 24V or the like. The controller 5 of the evaporated fuel processing device 1, the electronic control unit 60 of the internal combustion engine 61, and the like operate by being supplied with electric power from the battery 7. The controller 5 of the evaporated fuel processing device 1 operates by receiving power from the battery 7 when the internal combustion engine 61 of the vehicle 6 is on or off.

A lid switch 45, which is pushed by an occupant when refueling the fuel tank 62, is provided inside the vehicle 6. Ejection of the evaporated fuel F1 from the fuel tank 62 to the canister 2 is performed by operating the lid switch 45. As shown in FIG. 1, the canister 2 includes a case 21 and an adsorbent 22 such as activated carbon. The adsorbent 22 adsorbs the evaporated fuel (i.e., fuel vapor) F1. The case 21 of the canister 2 includes an inlet 211, an outlet 212, and a pressure release port 213. The inlet 211 is connected to the vapor pipe 41 and allows the gas G to enter. The outlet 212 is connected to the purge pipe 42 and allows fuel components to exit. The pressure release port 213 is openable to the atmosphere. An open-close valve 23 for opening and closing the pressure release port 213 is provided at the pressure release port 213. When the gas G is discharged (exhausted) from the fuel tank 62 to the canister 2, the open-close valve 23 opens the pressure release port 213 to the atmosphere. Then, in the canister 2, the fuel components of the evaporated fuel F1 of the gas G are adsorbed by the adsorbent 22, while the pressure P in the canister 2 becomes equal to atmospheric pressure.

The fuel components adsorbed by the adsorbent 22 of the canister 2 pass through the purge pipe 42 and are discharged to the intake pipe 611 of the internal combustion engine 61. At this time, the pressure release port 213 of the canister 2 is opened to the atmosphere, and the purge pipe 42 is opened by the purge valve 43. The fuel components adsorbed by the adsorbent 22 are discharged to the intake pipe 611 of the internal combustion engine 61 by an airflow caused due to the pressure difference between the pressure of the atmosphere entering the canister 2 through the pressure release port 213 and the negative pressure in the intake pipe 611.

Figure 3:
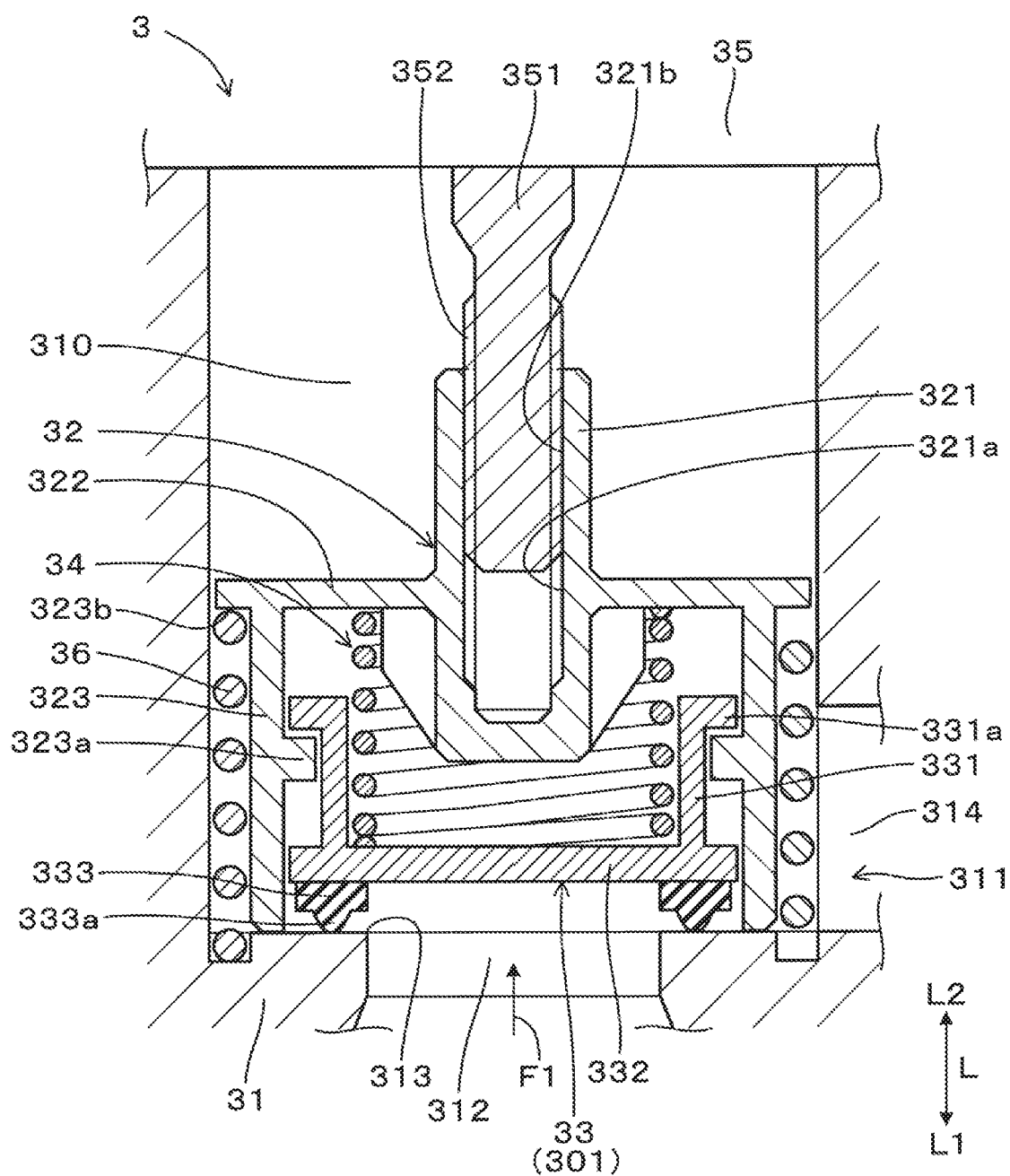
FIG. 3 is a schematic sectional view illustrating a sealing valve of the evaporated fuel processing device according to the first embodiment at a closed position.
Figure 4:
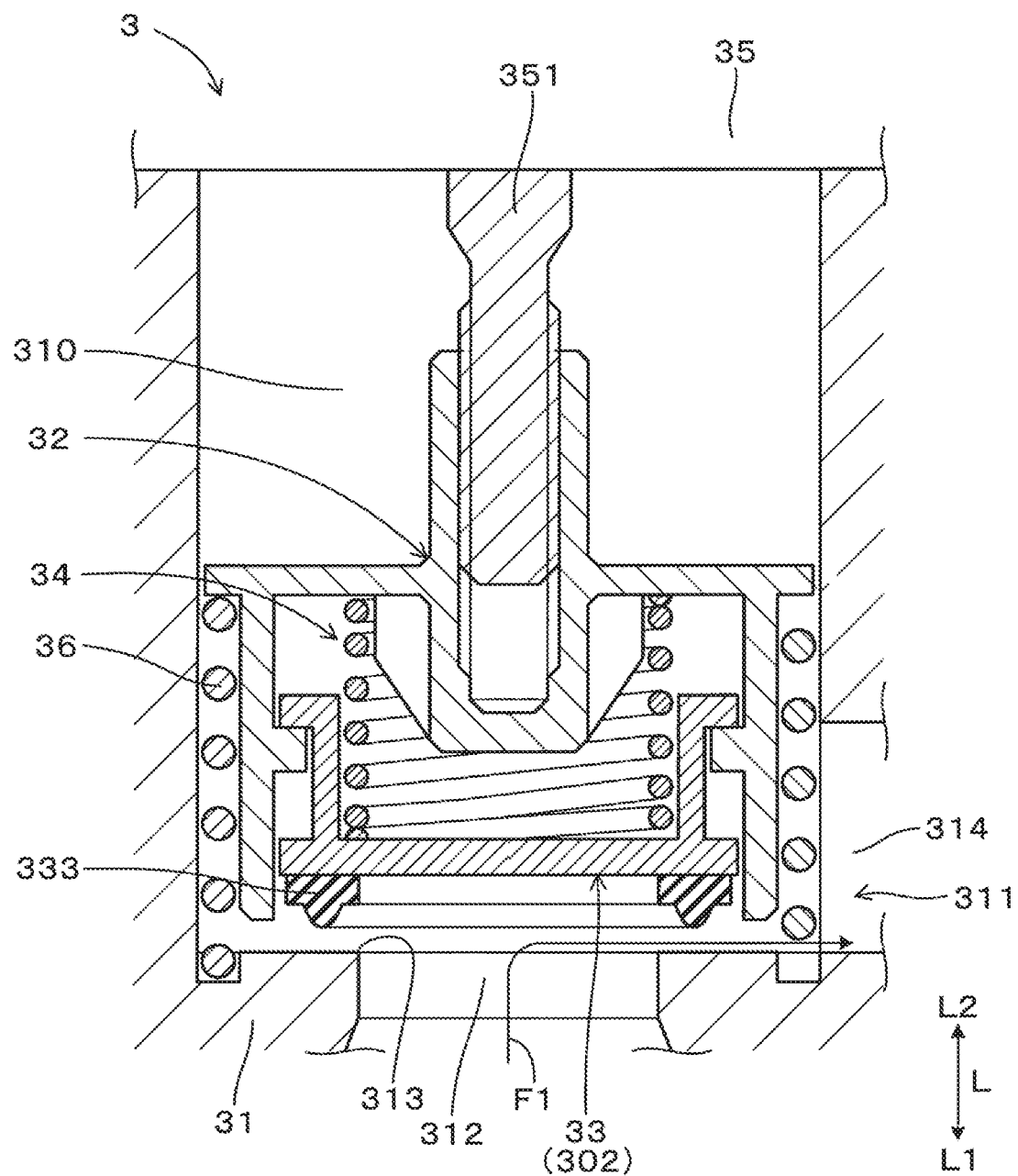
FIG. 4 is a schematic sectional view illustrating the sealing valve of the first embodiment at an open position.

As shown in FIGS. 3 and 4, the sealing valve 3 of the present embodiment is an electric valve that functions as a control valve. The sealing valve 3 receives the supply of electric power from the battery 7 to operate the stepping motor 35 so as to control the opening degree for opening and closing the vapor pipe 41. The stepping motor 35 has a fixed rotational position when the power supply from the battery 7 is cut off and the power is not supplied. In addition to the stepping motor 35, for example, an actuator that can quantitatively control the slide position can be used as the actuator that drives the sealing valve 3.

The sealing valve 3 includes a housing 31, a valve guide 32, a valve 33, a valve-side spring 34, the stepping motor 35, and a guide-side spring 36. The housing 31 forms a case for the sealing valve 3, and includes a sealing passage 311 connected to the vapor pipe 41. The valve guide 32 is movable forward and backward with respect to the housing 31 by converting the rotational force of the stepping motor 35 into an actuating force. The valve 33 is slidably engaged with the valve guide 32 and is configured to open and close the sealing passage 311 of the housing 31.

The valve-side spring 34 is sandwiched between the valve guide 32 and the valve 33 and biases the valve 33 in a direction to close the sealing passage 311. The guide-side spring 36 is disposed on the outer periphery of the valve guide 32, and serves to reduce backlash generated between an output shaft 351 of the stepping motor 35 and the valve guide 32.

As shown in FIGS. 3 and 4, the housing 31 includes a housing hole 310 for housing the valve guide 32 and the sealing passage 311 which is in communication with the housing hole 310. The housing hole 310 is formed in a proximal side L2 along the axial direction L of the housing 31. The sealing passage 311 includes an inflow portion 312 and an outflow portion 314. The inflow portion 312 is connected to the fuel tank 62. The gas G flows in through the inflow portion 312. Further, the gas G flows out through the outflow portion 314 to the canister 2. The inflow portion 312 is formed parallel to the housing hole 310 at the distal side L1 of the housing hole 310, and the outflow portion 314 is formed perpendicular to the housing hole 310.

The axial direction L is parallel to the open/close direction along which the valve 33 opens and closes the sealing passage 311. In the axial direction L of the sealing valve 3, the side on which the stepping motor 35 is disposed is referred to as the proximal side L2, and the side on which the sealing passage 311 is closed by the valve 33 is referred to as the distal side L1.

As shown in FIGS. 3 and 4, the valve guide 32 includes a center shaft portion 321, a guide disc portion 322, a guide cylinder portion 323, and a locking portion 323a. The center shaft portion 321 is fixed to the output shaft 351 of the stepping motor 35. The guide disc portion 322 is formed around the center shaft portion 321. The guide cylinder portion 323 is formed in a cylindrical shape protruding from the peripheral portion of the guide disc portion 322. The locking portion 323a is formed on the inner peripheral surface of the guide cylinder portion 323 to lock the valve 33. A male threading 352 is formed on the outer surface of the output shaft 351 of the stepping motor 35. A hollow hole 321a is formed at the center of the center shaft portion 321 of the valve guide 32, and a female threading 321b is formed on the inner surface of the hollow hole 321a. The female threading 321b is engaged with the male threading 352 of the output shaft 351 of the stepping motor 35. The locking portion 323a is formed as a protruding portion that protrudes inward from the inner peripheral surface of the guide cylinder portion 323. The main body of the stepping motor 35 is fixed to the housing 31.

As shown in FIGS. 3 and 4, the valve 33 includes a valve cylinder portion 331, a valve closing plate portion 332, and a sealing member 333. The valve cylinder portion 331 is disposed inside the guide cylinder portion 323 of the valve guide 32. Further, the valve cylinder portion 331 includes an engaging protrusion 331a configured to lock with the locking portion 323a of the valve guide 32. The valve closing plate portion 332 closes the end portion of the valve cylinder portion 331. The sealing member 333 is a ring-shaped member disposed on the valve closing plate portion 332. The sealing member 333 is configured to close an opening portion 313 of the sealing passage 311. The valve cylinder portion 331 is formed in a cylindrical shape and guides the outer periphery of the valve-side spring 34. The engaging protrusion 331a is formed so as to protrude radially outward from an end portion of the valve cylinder portion 331 on the proximal side L2 of the axial direction L. The valve closing plate portion 332 and the engaging protrusion 331a are guided in the axial direction L by the inner circumference of the guide cylinder portion 323 of the valve guide 32.

The sealing member 333 is arranged in the housing 31 at the periphery of the opening portion 313 of the inflow portion 312 of the sealing passage 311. A sealing portion 333a is formed on the distal side L1 of the sealing member 333 in the axial direction in the housing 31. The sealing portion 333a is configured to elastically deform when coming into contact with the peripheral portion of the opening portion 313 of the inflow portion 312 of the sealing passage 311. The position of the distal side L1 of the entirety of the sealing portion 333a in the axial direction L is within an imaginary plane parallel to the surface of the valve closing plate portion 332 on the proximal side L2 in the axial direction L.

The valve 33 is biased toward the distal side L1 in the axial direction L by the valve-side spring 34, and the engaging protrusion 331a of the valve cylinder portion 331 of the valve 33 engages with the locking portion 323a of the guide cylinder portion 323 of the valve guide 32. Due to this, the valve 33 is retained within the valve guide 32. As shown in FIGS. 3 and 4, the valve 33 is movable between a closed position 301 and an open position 302. Specifically, the valve 33 is normally in the closed position 301 due to being biased by the valve-side spring 34 to close the sealing passage 311. Further, the valve 33 is configured to be moved toward the open position 302 in accordance with a movement amount of the valve guide 32 toward the proximal side L2 in the axial direction L. The open position 302 determines the opening degree of the sealing passage 311. The closed position 301 is also referred to as an initial position (normal position) of the valve 33. In other words, the default state of the valve 33 is to close the sealing passage 311 with the sealing member 333. The open position 302 indicates a position where the sealing passage 311 is opened even by a small amount by the valve 33, and indicates that the sealing valve 3 opens the vapor pipe 41 at an arbitrary opening degree.

As shown in FIG. 3, the opening portion 313 of the inflow portion 312 of the sealing passage 311 is normally closed by the sealing portion 333a of the sealing member 333 of the valve 33. In this state, the valve-side spring 34 is in a compressed state and applies a spring force on the valve closing plate portion 332 toward the distal side L1 in the axial direction L. At the same time, the gas G in the inflow portion 312 exerts a fuel pressure on the valve closing plate portion 332 toward the proximal side L2 in the axial direction L. In the state shown in FIG. 3, the spring force is greater than the fuel pressure. As a result, the valve 33 is maintained at the closed position 301, and the sealing passage 311 is maintained in a closed state.

As shown in FIG. 4, when the valve guide 32 is moved by the stepping motor 35 toward the proximal side L2 in the axial direction L in order to open the opening portion 313 of the inflow portion 312 of the sealing passage 311, the valve 33 and the valve-side spring 34 are also moved toward the proximal side L2 in the axial direction L. As a result, the sealing portion 333a of the sealing member 333 of the valve 33 separates from the peripheral edge of the opening portion 313 of the inflow portion 312 of the sealing passage 311 in the housing 31, and the valve 33 moves to the open position 302 to open the sealing passage 311. In this manner, the amount by which the valve guide 32, the valve 33, and the valve-side spring 34 move toward the proximal side L2 in the axial direction L is determined according to the number of drive pulses applied to the stepping motor 35. Thus, the opening amount of the sealing passage 311 is quantitatively determined.

As shown in FIGS. 3 and 4, the valve-side spring 34 and the guide-side spring 36 are compression coil springs (torsion coil springs) in which a round wire as a strand is spirally twisted. The valve-side spring 34 applies a predetermined biasing force to the valve 33 to close the sealing passage 311, and is configured to retain the valve 33 at the closed position 301 through this biasing force. The guide-side spring 36 is arranged on the outer circumference of the guide cylinder portion 323 of the valve guide 32. The guide-side spring 36 is interposed between a step portion 323b of the guide cylinder portion 323 and the peripheral edge of the opening portion 313 of the inflow portion 312 of the sealing passage 311 in the housing 31.

The valve guide 32 is biased by the guide-side spring 36 to the proximal side L2 in the axial direction L, and therefore, a gap between the male threading 352 of the output shaft 351 of the stepping motor 35 and the female threading 321b of the central hole of the center shaft portion 321 of the valve guide 32 is held on one side in the axial direction L. Thus, when the output shaft 351 of the stepping motor 35 rotates, backlash between the output shaft 351 and the valve guide 32 in the axial direction L is reduced.

As shown in FIG. 1, the purge valve 43 is configured to open the purge pipe 42 when purging (discharging) the fuel component adsorbed by the adsorbent 22 of the canister 2 to the intake pipe 611 of the internal combustion engine 61 and when purging (discharging) the gas G in the fuel tank 62 to the intake pipe 611 of the internal combustion engine 61. The purge valve 43 of this embodiment has a function of opening and closing the purge pipe 42 in an on or off manner.

The purge valve 43 may be repeatedly opened and closed using a pulse-shaped energization command signal, and by controlling the on/off ratio (duty ratio) of the pulse width, to quantitatively adjust the opening degree of the purge pipe 42. In this case, when purging the purge gas containing the fuel component from the canister 2 to the intake pipe 611 of the internal combustion engine 61, the flow rate of the purge gas flowing through the purge valve 43 can be appropriately adjusted. Alternatively, the purge valve 43 may be a control valve that can quantitatively adjust the opening degree at which the purge pipe 42 is opened.

As shown in FIG. 1, the pressure sensor 44 is a pressure gauge that detects the pressure P of the gas G in the fuel tank 62. Most of the pressure P of the gas G in the fuel tank 62 is due to the vapor pressure of the evaporated fuel F1.

As shown in FIGS. 1 and 2, the controller 5 of the evaporated fuel processing device 1 is disposed in an electronic control unit 60 of the vehicle 6. The sealing valve 3, the purge valve 43, and the open-close valve 23 are connected to the controller 5 as output devices, and are configured to open and close in response to a command from the controller 5. When a predetermined number of drive pulses are supplied from the controller 5 to the stepping motor 35 in the sealing valve 3, the valve 33 opens the opening portion 313 of the sealing passage 311. The pressure sensor 44, the lid switch 45, and the lid sensor 46 are connected to the controller 5 as input devices.

Note that the controller 5 of the evaporated fuel processing device 1 may be provided separately from the electronic control unit 60 of the vehicle 6, and may be connected to the electronic control unit 60 of the vehicle 6 so that data can be transmitted and received between the evaporated fuel processing device 1 and the vehicle 6.

When refueling the fuel tank 62, the controller 5 receives an input from the lid switch 45 and controls the operation of discharging the evaporated fuel F1 in the fuel tank 62 to the canister 2. The controller 5 controls the stepping motor 35 to open the sealing valve 3 when the lid switch 45 is pressed. After the sealing valve 3 is opened, when the pressure P sensed by the pressure sensor 44 becomes equal to or lower than the specified pressure, the controller 5 drives the stepping motor 35 to close the sealing valve 3, and opens the fuel lid 620 by driving the lid actuator 47.

The controller 5 can execute each of the sealing operation, the vapor operation 501, the discharging operation 502, the purge operation 503, and the learning operation 504. The sealing operation by the controller 5 is an operation of closing the vapor pipe 41 by the sealing valve 3 and sealing the fuel tank 62. In other words, The sealing operation by the controller 5 refers to an operation in which the valve 33 of the sealing valve 3 closes the opening portion 313 of the sealing passage 311 and maintains the fuel tank 62 in a sealed state. During the sealing operation, the rotation position of the output shaft 351 of the stepping motor 35 is held to maintain a state in which the valve 33 is at the closed position (initial position) 301. During normal operation of the evaporated fuel processing device 1, the controller 5 executes the sealing operation. In other words, the sealing operation is performed by default.

The vapor operation 501 by the controller 5 is an operation of opening the vapor pipe 41 by the sealing valve 3 and discharging the gas G in the fuel tank 62 to the canister 2. The vapor operation 501 is performed when the gas G in the fuel tank 62 is discharged to the canister 2 before refueling the fuel tank 62. The pressure P of the gas G in the fuel tank 62 is decreased by performing the vapor operation 501. Therefore, when the fuel supply port 621 of the fuel tank 62 is opened, the evaporated fuel F1 in the gas G of the fuel tank 62 is restricted from being released into the atmosphere. The controller 5 can end the vapor operation 501 when the pressure P of the gas G detected by the pressure sensor 44 becomes equal to or lower than a predetermined value.

The discharging operation 502 by the controller 5 is an operation of opening the purge pipe 42 by the purge valve 43 and purging the fuel component in the canister 2 into the intake pipe 611. The discharging operation 502 is performed when the fuel component adsorbed by the adsorbent 22 of the canister 2 is to be used in the internal combustion engine 61 for a combustion of a mixture of fuel and air.

The purge operation 503 by the controller 5 opens the vapor pipe 41 by the sealing valve 3 and the purge pipe 42 by the purge valve 43, to purge the gas G in the fuel tank 62 to the intake pipe 611, bypassing the canister 2. The purge operation 503 is performed when, after the fuel tank 62 is refueled and the internal combustion engine 61 initiates a combustion operation, the gas G in the fuel tank 62 is supplied to the intake pipe 611 of the internal combustion engine 61. In the purge operation 503, the evaporated fuel F1 in the gas G passes through a part of the canister 2 without being adsorbed by the adsorbent 22 of the canister 2.

By performing the purge operation 503, the pressure P of the gas G in the fuel tank 62 can be reduced during the combustion operation of the internal combustion engine 61. The controller 5 starts the purge operation 503 when the pressure P of the gas G detected by the pressure sensor 44 becomes equal to or higher than a predetermined value. When the pressure P of the gas G detected by the pressure sensor 44 is less than or equal to a predetermined value, the purge operation 503 can be terminated.

Figure 5:
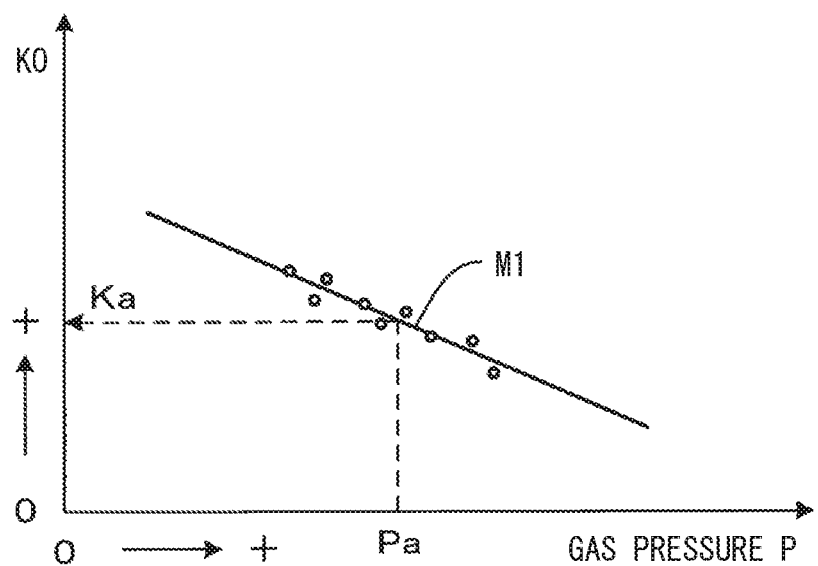
FIG. 5 is a graph illustrating a pressure relation map between a gas pressure in the fuel tank and an opening start amount of the sealing valve according to the first embodiment.

The controller 5 can also perform the learning operation 504 while the sealing operation is being performed. Specifically, the opening degree command K1, which is sent from the opening instruction unit 51 to the stepping motor 35, is gradually increased from zero. Further, the learning operation 504 is performed during a process in which the pressure P of the gas G in the fuel tank 62 changes while the sealing operation is being performed. As shown in FIG. 5, a pressure relation map M1 between the opening start amount K0 and the pressure P of the gas G can be obtained by the learning operation 504 for a plurality of different cases where the pressure P of the gas G is different.

The controller 5 has a function of correcting a dead zone generated in the sealing valve 3. This function focuses on the fact that the sealing valve 3 opens only when the command amount to the stepping motor 35 that drives the sealing valve 3 reaches a predetermined amount. The controller 5 increases the command amount by this predetermined amount.

As shown in FIG. 2, the controller 5 includes an opening instruction unit 51, a valve open detector 52, a relation learning unit 53, and an opening correction unit 54. The opening instruction unit 51 is configured to transmit an opening degree command K1 for determining the opening degree of the sealing valve 3 to the stepping motor 35. When the opening degree command K1 is gradually increased from zero, the valve open detector 52 is configured to determine that the opening degree command K1 has reached the opening start amount K0 when the pressure P of the gas G starts to decrease. In the present embodiment, when the pressure P of the gas G starts to decrease, it is determined that the sealing valve 3 has changed from the closed state to the open state.

As shown in FIG. 5, when the valve open detector 52 detects a plurality of different opening start amounts K0, and when the pressure sensor 44 detects a plurality of different pressures P of the gas G, the relation learning unit 53 learns the relationship between the opening start amount K0 and the pressure P of the gas G, and creates a pressure relation map M1 between the opening start amount K0 and the pressure P of the gas G. The opening start amount K0 decreases as the pressure P of the gas G detected by the pressure sensor 44 increases. In other words, the higher the pressure P of the gas G detected by the pressure sensor 44, the larger the dead zone of the sealing valve 3, such that the sealing valve 3 becomes more difficult to open.

Figure 6:
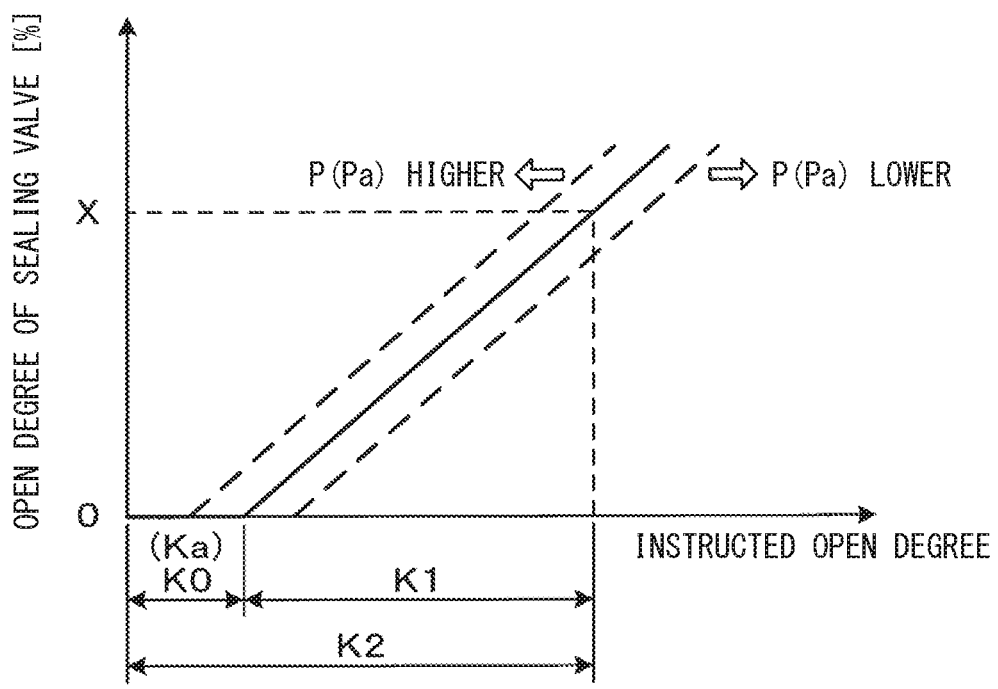
FIG. 6 is a graph illustrating a relationship between an instructed open degree and an open degree of the sealing valve according to the first embodiment.

As shown in FIGS. 5 and 6, the opening correction unit 54 has a function of correcting the dead zone. The opening correction unit 54 refers to the pressure relation map M1 with an operating-time pressure Pa, which is the pressure P of the gas G detected by the pressure sensor 44 when the sealing valve 3 is opened to perform the vapor operation 501 or the purge operation 503. The opening correction unit 54 reads an operating-time opening start amount Ka which is the opening start amount K0 at this time, and corrects the opening degree command K1 by the opening instruction unit 51 using the operating-time opening start amount Ka.

As shown in FIGS. 3 and 4, the opening instruction unit 51 of the controller 5 transmits the opening degree command K1 to the stepping motor 35 of the sealing valve 3 during the vapor operation 501, the purge operation 503, and the learning operation 504. The opening degree command K1 is a predetermined number of drive pulses for driving the stepping motor 35. The opening degree command K1 from the opening instruction unit 51 is determined by the number of drive pulses for driving the stepping motor 35. The output shaft 351 of the stepping motor 35 rotates by a predetermined angle in response to each drive pulse transmitted to the stepping motor 35. Accordingly, the valve guide 32, the valve 33, and the valve-side spring 34 move by a predetermined amount in the axial direction L per drive pulse as well.

The opening degree of the sealing valve 3 is determined according to the number of pulses transmitted to the stepping motor 35. However, a dead zone exists in the sealing valve 3. The dead zone means that the valve 33 is actually closed even when the stepping motor 35 is energized in a step-like manner while the valve 33 of the sealing valve 3 is in the closed position 301. The dead zone is defined as the number of pulses that do not move the valve 33 from the closed position 301, in other words, the number of pulses during which the sealing member 333 of the valve 33 does not separate from the sealing passage 311 and the pressure P of the gas G does not begin to decrease. In addition, the number of pulses equal to the dead zone is represented as an opening start amount K0 of the sealing valve 3.

As shown in FIG. 6, the opening start amount K0 compensates for the dead zone of the sealing valve 3. When the opening start amount K0 is added to the opening degree command K1 by the opening instruction unit 51, the opening degree command K1 can be used to proportionally change the opening degree of the sealing valve 3 from zero. Further, the opening start amount K0 can be regarded as an opening correction amount for correcting the opening degree command K1 with the opening instruction unit 51. The opening start amount K0 changes according to the pressure P of the gas G as an opening correction amount.

During the learning operation 504, when the valve 33 is in the closed position (initial position) 301, the valve open detector 52 of the controller 5 monitors two values: the opening degree command K1 transmitted from the opening instruction unit 51 to the stepping motor 35, and the pressure P of the gas G received from the pressure sensor 44. Then, the valve open detector 52 detects the value of the opening degree command K1 when the pressure P of the gas G begins to decrease as the opening start amount K0. The opening start amount K0 is represented by an integrated value of the number of drive pulses transmitted to the stepping motor 35. The point in time when the pressure P of the gas G begins to decrease can be defined as the point in time when the pressure P of the gas G has decreased by a predetermined amount.

As shown in FIG. 5, the relation learning unit 53 of the controller 5 is provided so that, after the vehicle 6 and the evaporated fuel processing device 1 are started, the opening instruction unit 51 can correct the opening degree command K1 based on the pressure P of the gas G. The relation learning unit 53 is configured to, when the valve 33 is in the closed position 301, read the opening start amount K0 detected by the valve open detector 52 while the opening instruction unit 51 gradually increases the opening degree command K1 from zero. The relation learning unit 53 reads this for a plurality of different pressures P. Then, a pressure relation map M1 between the opening start amount K0 and the pressure P of the gas G is created, in which the relationship between the opening start amount K0 and the pressure P of the gas G is learned.

The pressure P of the gas G acting on the inflow portion 312 of the sealing passage 311 is higher than the pressure in the canister 2 acting on the outflow portion 314 of the sealing passage 311. A net pressure acts on the valve 33 that biases the valve 33 toward the proximal side L2 of the axial direction L. Then, as the pressure P increases, the net pressure, which biases the valve 33 toward the proximal side L2 of the axial direction L, also increases. For this reason, the opening start amount K0 of the open-close valve 23 detected by the valve open detector 52 is smaller as the pressure P increases.

As shown in FIG. 6, the opening correction unit 54 of the controller 5 corrects the opening degree command K1 from the opening instruction unit 51 by taking the opening start amount K0 into consideration. As a result, even if the opening degree of the sealing valve 3 is not directly measured, the opening correction unit 54 is able to correct the error factor caused by the dead zone of the sealing valve 3 such that the opening degree of the sealing valve 3 matches a target opening degree. This ensures that the flow rate of the gas G passing through the sealing valve 3 is controlled to an appropriate flow rate.

As shown in FIG. 5, the opening correction unit 54 uses the pressure relation map M1 between the opening start amount K0 and the pressure P of the gas G when performing both the vapor operation 501 and the purge operation 503. Then, the opening degree command K1 by the opening instruction unit 51 is corrected. When performing the vapor operation 501 and the purge operation 503, the opening correction unit 54 detects the operating-time pressure Pa, which is the pressure P of the gas G when the vapor pipe 41 is opened by the sealing valve 3, using the pressure sensor 44.

Next, the opening correction unit 54 refers the operating-time pressure Pa in the pressure relation map M1 and reads the operating-time opening start amount Ka, which is the opening start amount K0 corresponding to the operating-time pressure Pa. Next, when the opening instruction unit 51 transmits the opening degree command K1 to the stepping motor 35 of the sealing valve 3, the opening correction unit 54 adds the operating-time opening start amount Ka to the opening degree command K1 in order to correct the opening degree command K1. In other words, the opening correction unit 54 changes the number of pulses indicated by the opening degree command K1 transmitted from the opening instruction unit 51 to the stepping motor 35 to a number of pulses obtained by adding the number of pulses corresponding to the opening degree command K1 to the number of pulses corresponding to the operating-time opening start amount Ka.

As a result, as shown in FIG. 6, a corrected opening degree K2 is obtained by the opening correction unit 54 by adding the opening degree command K1, which is based on a target opening degree for the opening degree of the sealing valve 3, to the operating-time opening start amount Ka. Then, during the vapor operation 501 and the purge operation 503, when the vapor pipe 41 is opened by the sealing valve 3, the opening instruction unit 51 sends the corrected opening degree K2 to the stepping motor 35 of the sealing valve 3, and the opening degree of the sealing valve 3 is set.

As shown in FIGS. 1 and 2, the restoration detector 55 of the controller 5 is configured to detect the electric power supplied from the battery 7 to the controller 5. The restoration detector 55 uses a sensor provided in the battery 7 or the controller 5 for detecting a voltage or a current from the battery 7 to the controller 5, and detects whether or not power is supplied by a signal from the sensor.

The power supply from the battery 7 to the controller 5 is cut off, for example, when the battery 7 itself fails, the fuse of the battery 7 is cut, the cable is disconnected from the battery 7 to the controller 5, or the connector of the cable is disconnected. In these cases, electric power is not supplied to the controller 5, and maintenance is required to restore the electric power. Then, when the power supply to the controller 5 is restored by the maintenance, the restoration detector 55 detects the restoration of the voltage or the current to the normal value. The restoration of the power supply from the battery 7 to the controller 5 is detected when the power of the battery 7 is electrically reconnected to the controller 5. In addition, the restoration detector 55 can detect that the supply of electric power is restored when the voltage applied to the controller 5 becomes equal to or higher than a predetermined value.

As shown in FIGS. 1 and 2, the controller 5 does not have a function of storing the rotational position of the stepping motor 35. Then, when the power supply from the battery 7 to the controller 5 is restored after the power supply from the battery 7 to the controller 5 is cut off, the controller 5 cannot know where the rotational position of the stepping motor 35 is. When the restoration detector 55 detects that the supply of electric power from the battery 7 to the controller 5 is restored, the restoration actuator 56 of the present embodiment is configured send a command representing a total amount for changing the opening degree of the sealing valve 3 between a fully closed position and a fully opened position to the stepping motor 35 in the direction to close the sealing valve 3.

In other words, since the restoration actuator 56 cannot grasp the rotational position of the stepping motor 35, when the power is restored, the restoration actuator 56 transmits the command corresponding to the total amount of the opening degree to ensure that the sealing valve 3 is fully closed to the stepping motor 35. The command to the stepping motor 35 corresponding to the total amount of the opening degree means that the valve 33 can change the sealing passage 311 from the fully closed state to the fully opened state or from the fully opened state to the fully closed state.

In the present embodiment, the corrected opening degree K2 from the opening instruction unit 51 to the stepping motor 35 is set as the command representing the total amount of the opening degree after being corrected by the opening correction unit 54 in consideration of the dead zone generated in the sealing valve 3. That is, the command corresponding to the total amount of the opening degree is corrected by the opening correction unit 54, by adding the rotation amount for correcting the dead zone to the rotation amount of the stepping motor 35 for changing the opening degree of the sealing valve 3 between a fully closed position and a fully opened position. In other words, the command representing the total amount of the opening degree can be set as the corrected opening degree K2 to correspond to a driving pulse number in which an extra driving pulse number is added to the number of drive pulses of the stepping motor 35 for changing the opening degree of the sealing valve 3 between a fully closed position and a fully opened position in consideration of the range forming the dead zone.

Figure 7:
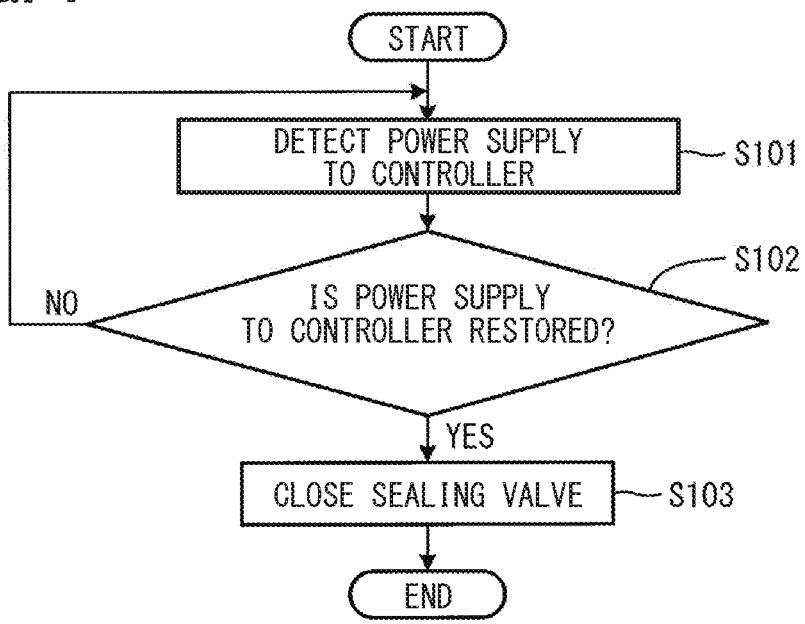
FIG. 7 is a flowchart illustrating a control method according to the first embodiment.

Next, a control method using the controller 5 of the evaporated fuel processing device 1 will be described with reference to the flowchart of FIG. 7.

When the electric power is normally supplied from the battery 7 to the controller 5, the sealing valve 3, the purge valve 43, the open-close valve 23, etc. are operated in response to a command from the controller 5. The restoration detector 55 of the controller 5 functions after the power supply from the battery 7 to the controller 5 is cut off. After the power supply from the battery 7 to the controller 5 is cut off, the restoration detector 55 detects the power supply from the battery 7 to the controller 5 (S101). The restoration detector 55 determines whether or not the power supply from the battery 7 to the controller 5 is restored (S102).

Then, when the restoration detector 55 detects the restoration of the power supply, the restoration actuator 56 causes the opening instruction unit 51 to transmit the command corresponding to the total amount of the opening degree to the stepping motor 35 to close the sealing valve 3 (S103). As a result, when the power supply to the controller 5 is restored, the sealing valve 3 is temporarily returned to the closed position (initial position) 301 for closing the vapor pipe 41. After that, the sealing valve 3 is opened according to the timing at which the vapor operation 501 or the purge operation 503 is performed by the controller 5.

The controller 5 of the evaporated fuel processing device 1 of the present embodiment can cope with an abnormality generated in the power system including the battery 7 and the wiring from the battery 7 to the controller 5, when the electric sealing valve 3 that is driven by the stepping motor 35 and does not have the function of detecting the opening degree is used.

The electric sealing valve 3 adjusts the opening degree according to the command to the stepping motor 35. However, the electric sealing valve 3 cannot detect the opening degree, in other words, has no function feeding back the rotational position of the stepping motor 35. Therefore, when the electric power is not supplied from the battery 7 to the controller 5, the opening degree of the sealing valve 3 is unknown.

The controller 5 includes the restoration detector 55 and the restoration actuator 56. When the restoration detector 55 detects that the power supply is restored after the power supply is cut off, the restoration actuator 56 drives the stepping motor 35 so that the opening degree of the sealing valve 3 is fully closed. With this configuration, in case where the power supply from the battery 7 to the controller 5 is stopped by an abnormality generated in the power system including the battery 7, when the power supply is restored, the opening degree of the sealing valve 3 is fully closed at the initial position 301 which is a reference position. Then, after the supply of electric power is restored, the sealing valve 3 can be adjusted to have a required opening degree after operating once in the initial position 301.

Therefore, according to the controller 5 of the evaporated fuel processing device 1 of the present embodiment, the sealing valve 3 can be appropriately operated after the power supply from the battery 7 to the controller 5 is cut off.

The restoration actuator 56 may be configured to drive the stepping motor 35 so that the sealing valve 3 is fully opened when the restoration detector 55 detects that the supply of electric power is restored. In this case, after the opening degree of the sealing valve 3 is fully opened, the opening degree of the sealing valve 3 can be appropriately adjusted to a required opening degree.

Second Embodiment

The restoration actuator 56 of the present embodiment is configured to determine that the sealing valve 3 is fully closed or fully opened after the power restoration according to the signal of the lid sensor 46 that detects the open/closed state of the fuel lid 620. Specifically, the restoration actuator 56 of the present embodiment is configured to send the command corresponding to the total amount of the opening degree to the stepping motor 35 so as to open the sealing valve 3 when the restoration detector 55 detects the restoration of the supply of electric power, and when the open/closed state of the fuel lid 620 detected by the lid sensor 46 is the open state. At this time, the fuel lid 620 is open, and it is determined that the fuel tank 62 was being refueled when the electric power was cut off. Therefore, once the opening degree of the sealing valve 3 is fully opened, the evaporated fuel F1 in the fuel tank 62 can be discharged to the adsorbent 22 of the canister 2.

The restoration actuator 56 of the present embodiment is configured to send a command corresponding to the total amount of the opening degree to the stepping motor 35 so as to close the sealing valve 3, when the restoration of the supply of electric power is detected by the restoration detector 55, and when the open/close state of the fuel lid 620 detected by the lid sensor 46 is the closed state. At this time, the fuel lid 620 is closed, the vapor operation 501 is not performed when the power is cut off, and it is determined that it is not necessary to open the sealing valve 3. Therefore, the fuel tank 62 is hermetically closed by temporarily closing the sealing valve 3 to the fully closed position.

Figure 8:
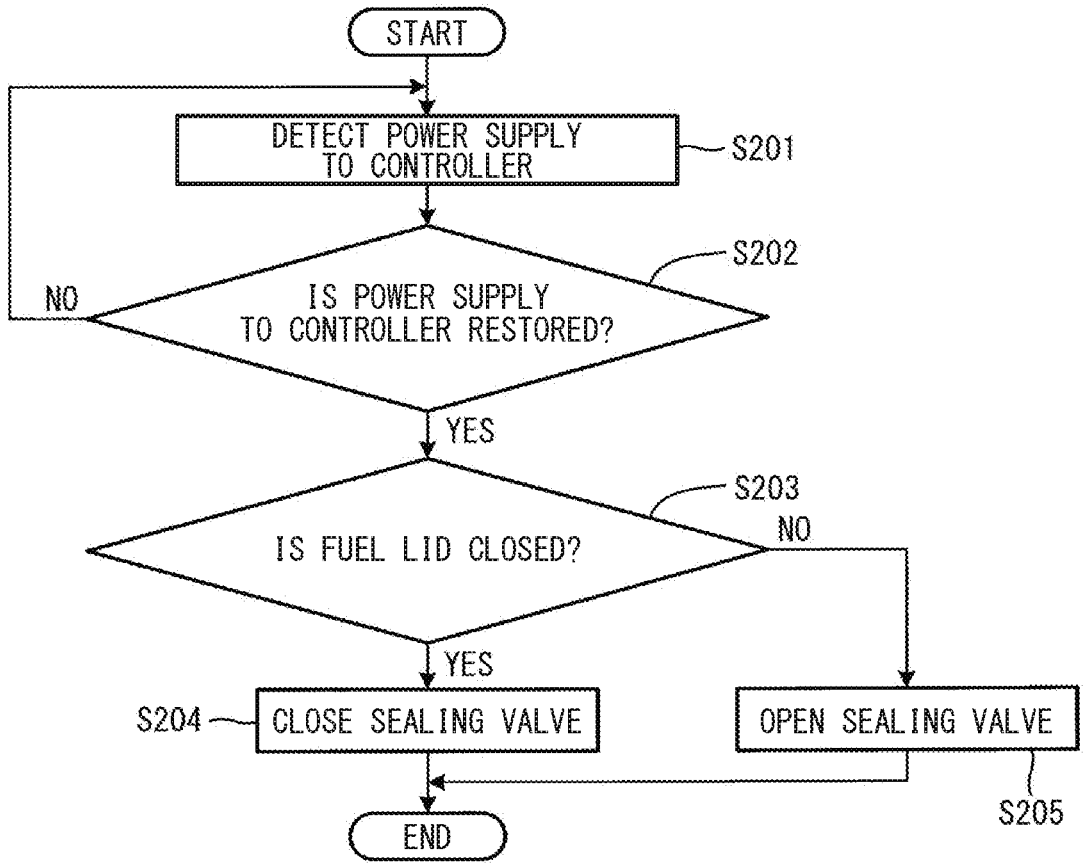
FIG. 8 is a flowchart illustrating a control method according to a second embodiment.

In the control method using the controller 5 of the evaporated fuel processing device 1 according to the present embodiment, as shown in the flowchart of FIG. 8, the electric power from the battery 7 to the controller 5 is detected (S201) after the supply of electric power from the battery 7 to the controller 5 is cut off. Next, the restoration detector 55 detects whether or not the power supply from the battery 7 to the controller 5 has been restored (S202). Then, when the restoration detector 55 detects the restoration of the power supply, the restoration actuator 56 causes the lid sensor 46 to detect whether or not the fuel lid 620 is in the closed state (S203).

When the fuel lid 620 is in the closed state, the restoration actuator 56 causes the opening instruction unit 51 to transmit the command corresponding to the total amount of the opening degree to the stepping motor 35 so as to close the sealing valve 3 (S204). As a result, the opening degree of the sealing valve 3 is fully closed, and the fuel tank 62 is sealed. On the other hand, when the fuel lid 620 is in the open state in S203, the restoration actuator 56 transmits the command representing the total amount of the opening degree to the stepping motor 35 so as to open the sealing valve 3 by the opening instruction unit 51 (S205). As a result, the opening degree of the sealing valve 3 is fully opened, and the evaporated fuel F1 can be discharged from the fuel tank 62 to the canister 2. After that, the opening degree of the sealing valve 3 is changed to an appropriate opening degree by a command from the opening instruction unit 51 to the stepping motor 35.

When the fuel lid 620 is in the open state at S203, the restoration actuator 56 can maintain the opening degree of the sealing valve 3 as it is at the time when the supply of electric power is cut off, instead of fully opening the opening degree of the sealing valve 3. In this case, after the power supply from the battery 7 to the controller 5 is restored, the restoration actuator 56 may not drive the stepping motor 35.

Other configurations, functions and effects of the evaporated fuel processing device 1 of the present embodiment are the same as those of the first embodiment. In this embodiment as well, components indicated by the same reference numerals as those in the first embodiment are the same as those in the first embodiment.

Third Embodiment

The restoration actuator 56 of the present embodiment is configured to determine the opening degree of the sealing valve 3 to be fully closed or opened in response to the signal of the lid sensor 46 that detects the open/closed state of the fuel lid 620 and the speed information of the vehicle 6, after the power is restored. Specifically, the restoration actuator 56 of the present embodiment is configured to receive information about whether the speed of the vehicle 6 is equal to or higher than a specified value from the electronic control unit 60 of the vehicle 6. When the controller 5 is included in the electronic control unit 60, the restoration actuator 56 uses the information on the vehicle speed in the controller 5. The vehicle speed may be detected by a speedometer or the like, and the specified value of the vehicle speed may be set as, for example, 1 km/h.

The restoration actuator 56 of the present embodiment is configured to send the command corresponding to the total amount of the opening degree of the sealing valve 3 to the stepping motor 35 so as to open the sealing valve 3, when the restoration detector 55 detects that the supply of electric power is restored, when the open/closed state of the fuel lid 620 detected by the lid sensor 46 is in the open state, and when the vehicle speed is less than the specified value. At this time, since the vehicle 6 is stopped with the fuel lid 620 open, it is determined that the fuel tank 62 is being refueled when the electric power is cut off. Therefore, once the opening degree of the sealing valve 3 is fully opened, the evaporated fuel F1 in the fuel tank 62 can be discharged to the adsorbent 22 of the canister 2.

When the restoration detector 55 detects the restoration of the supply of electric power, when the open/closed state of the fuel lid 620 detected by the lid sensor 46 is in the open state, and when the vehicle speed is higher than or equal to a specified value, the restoration actuator 56 of the present embodiment sends the command corresponding to the total amount of the opening degree of the sealing valve 3 to the stepping motor 35 so as to close the sealing valve 3. At this time, although the fuel lid 620 is open, the vehicle 6 is traveling, so it is determined that the fuel lid 620 was forgotten to be closed after the fuel tank 62 was refueled. Therefore, the opening degree of the sealing valve 3 can be once fully closed. When the vehicle 6 starts traveling with the fuel lid 620 open, a warning lamp or the like can be turned on in the instrument panel or the like of the vehicle 6.

When the restoration of the power supply is detected by the restoration detector 55, and when the open/closed state of the fuel lid 620 detected by the lid sensor 46 is the closed state, the restoration actuator 56 of the present embodiment sends the command corresponding to the total amount of the opening degree of the sealing valve 3 to the stepping motor 35 so as to close the sealing valve 3. At this time, the fuel lid 620 is closed, and the vapor operation 501 is not performed when the power is cut off, such that it is determined that it is not necessary to open the sealing valve 3. Therefore, the fuel tank 62 is hermetically closed by temporarily closing the sealing valve 3 to the full closed position.

Figure 9:
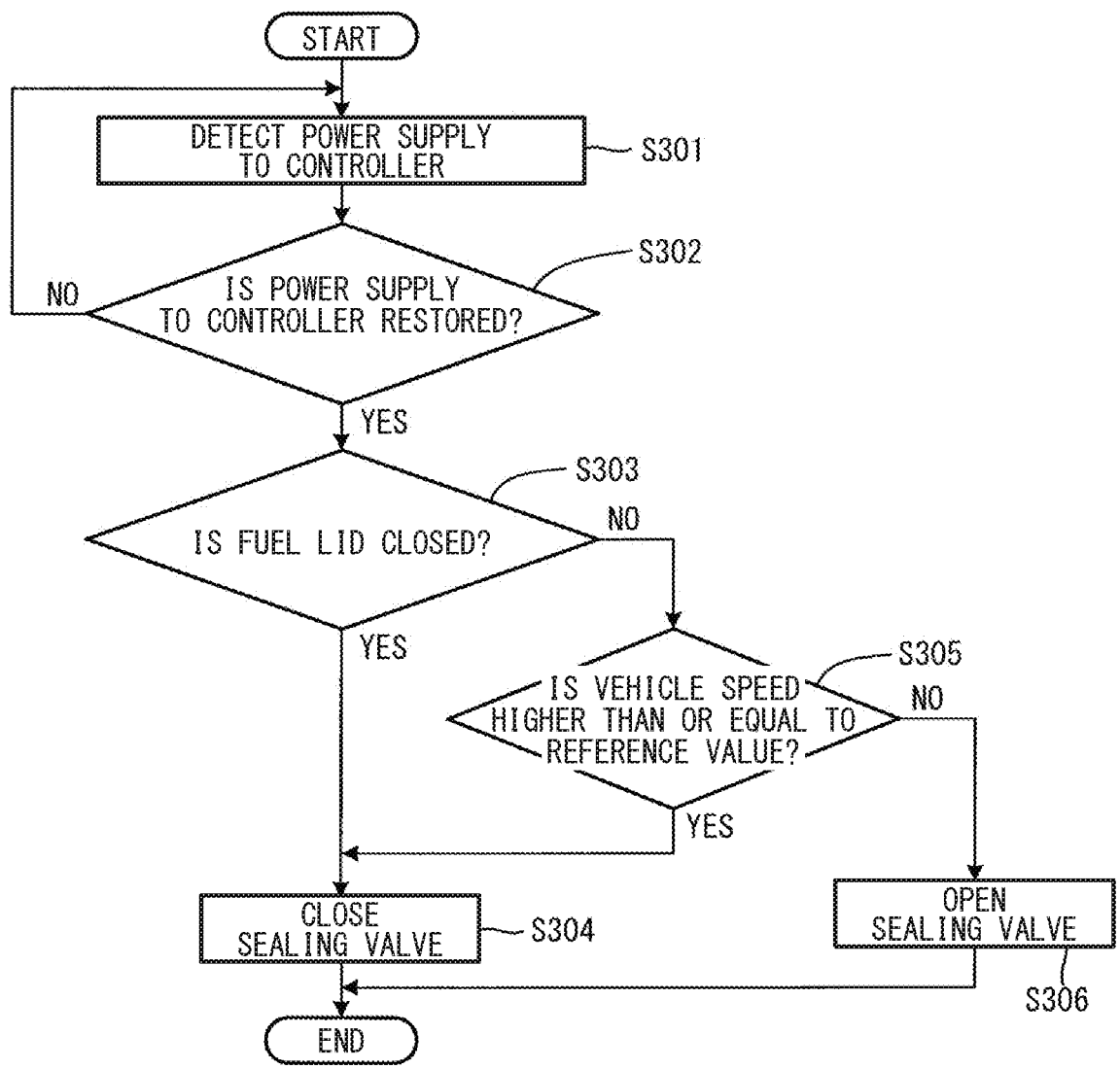
FIG. 9 is a flowchart illustrating a control method according to a third embodiment.

In the control method using the controller 5 of the evaporated fuel processing device 1 of the present embodiment, as shown in the flowchart of FIG. 9, the electric power from the battery 7 to the controller 5 is detected (S301) after the power supply is cut off. Next, the restoration detector 55 detects whether or not the supply of electric power from the battery 7 to the controller 5 is restored (S302). Then, when the restoration detector 55 detects the restoration of the power supply, the restoration actuator 56 detects whether or not the fuel lid 620 is in the closed state by the lid sensor 46 (S303).

When the fuel lid 620 is in the closed state, the restoration actuator 56 causes the opening instruction unit 51 to transmit the command corresponding to the total amount of the opening degree to the stepping motor 35 so as to close the sealing valve 3 (S304). As a result, the opening degree of the sealing valve 3 is fully closed, and the fuel tank 62 is sealed. On the other hand, when the fuel lid 620 is in the open state at S303, the restoration actuator 56 detects whether the vehicle speed is equal to or higher than the specified value (S305).

When the vehicle speed is equal to or higher than the specified value, the restoration actuator 56 determines that the fuel lid 620 has been forgotten to be closed, and the opening instruction unit 51 causes the stepping motor 35 to close the sealing valve 3 by sending the command representing the total amount of the opening degree (S304). As a result, the opening degree of the sealing valve 3 is fully closed, and the fuel tank 62 is sealed. On the other hand, when the vehicle speed is not equal to or higher than the specified value at S305, the restoration actuator 56 transmits the command from the opening instruction unit 51 to the stepping motor 35 so as to open the sealing valve 3 (S306). As a result, the opening degree of the sealing valve 3 is fully opened, and the evaporated fuel F1 can be discharged from the fuel tank 62 to the canister 2. After that, the opening degree of the sealing valve 3 is changed to an appropriate opening degree by a command from the opening instruction unit 51 to the stepping motor 35.

When the vehicle speed is not equal to or higher than the specified value at S305, the restoration actuator 56 can maintain the opening degree of the sealing valve 3 as it is at the time when the power supply is cut off, instead of fully opening the sealing valve 3. In this case, after the power supply from the battery 7 to the controller 5 is restored, the restoration actuator 56 may not drive the stepping motor 35.

Other configurations, functions and effects of the evaporated fuel processing device 1 of the present embodiment are the same as those of the first embodiment. In this embodiment as well, components indicated by the same reference numerals as those in the first embodiment are the same as those in the first embodiment.

The present disclosure is not limited to the above embodiments, and it is possible to configure further different embodiments without departing from the gist of the present disclosure. Further, the present disclosure includes various modifications, modifications within an equivalent range, and the like. Furthermore, combinations, forms, and the like of various components derived from the present disclosure are also included in the technical concept of the present disclosure.

What is claimed is:

1. An evaporated fuel processing device comprising:
   a canister configured to adsorb evaporated fuel evaporated from a fuel tank in a vehicle having an internal combustion engine and a battery;
   a vapor pipe connecting the fuel tank to the canister;
   a sealing valve provided in the vapor pipe, the sealing valve being driven by an actuator to quantitatively control an opening degree for opening and closing the vapor pipe; and
   a controller including
      a restoration detector configured to detect that a supply of power from the battery to the controller is restored after the supply of power from the battery to the controller is cut off, and
      a restoration actuator configured to drive the actuator so that the sealing valve is fully closed or fully opened when the restoration detector detects that the supply of power is restored.

2. The evaporated fuel processing device according to claim 1, wherein
   the restoration actuator is configured to transmit a command to the actuator to close the sealing valve, when the restoration detector detects that the supply of power is restored, the command representing a total amount of the opening degree to change the sealing valve between a fully closed position and a fully opened position.

3. The evaporated fuel processing device according to claim 1, wherein
   the controller further includes a cut-off detector configured to detect that a supply of power from the battery to the controller is cut off.

4. An evaporated fuel processing device comprising:
   a canister configured to adsorb evaporated fuel evaporated from a fuel tank in a vehicle having an internal combustion engine and a battery;
   a vapor pipe connecting the fuel tank to the canister;
   a sealing valve provided in the vapor pipe, the sealing valve being driven by an actuator to quantitatively control an opening degree for opening and closing the vapor pipe;
   a lid sensor configured to detect an open/close state of a fuel lid of the fuel tank; and
   a controller including
      a restoration detector configured to detect that a supply of power from the battery to the controller is restored after the supply of power from the battery to the controller is cut off, and
      a restoration actuator configured to drive the actuator so that the opening degree of the sealing valve is controlled or maintained when the restoration detector detects that the supply of power is restored, wherein
   the restoration actuator is configured to transmit a command representing a total amount of the opening degree to change the sealing valve between a fully closed position and a fully opened position,
   the restoration actuator is configured to transmit the command to the actuator to open the sealing valve or maintain the opening degree of the sealing valve, when the restoration detector detects that the supply of the power is restored and the lid sensor detects that the fuel lid is open, and
   the restoration actuator is configured to transmit the command to the actuator to close the sealing valve, when the restoration detector detects that the supply of the power is restored and the lid sensor detects that the fuel lid is closed.

5. The evaporated fuel processing device according to claim 4, wherein
   the controller further includes a cut-off detector configured to detect that a supply of power from the battery to the controller is cut off.

6. An evaporated fuel processing device comprising:
   a canister configured to adsorb evaporated fuel evaporated from a fuel tank in a vehicle having an internal combustion engine and a battery;
   a vapor pipe connecting the fuel tank to the canister;
   a sealing valve provided in the vapor pipe, the sealing valve being driven by an actuator to quantitatively control an opening degree for opening and closing the vapor pipe;
   a lid sensor configured to detect an open/close state of a fuel lid of the fuel tank; and
   a controller including
      a restoration detector configured to detect that a supply of power from the battery to the controller is restored after the supply of power from the battery to the controller is cut off, and
      a restoration actuator configured to drive the actuator so that the opening degree of the sealing valve is controlled or maintained when the restoration detector detects that the supply of power is restored, wherein
   the restoration actuator is configured to receive information from an electronic control unit of the vehicle whether or not a speed of the vehicle is higher than or equal to a specified value,
   the restoration actuator is configured to transmit a command representing a total amount of the opening degree to change the sealing valve between a fully closed position and a fully opened position,
   the restoration actuator is configured to transmit the command to the actuator to open the sealing valve or maintain the opening degree of the sealing valve, when the restoration detector detects that the supply of the power is restored, when the lid sensor detects that the fuel lid is open, and when the speed of the vehicle is lower than the specified value,
   the restoration actuator is configured to transmit the command to the actuator to close the sealing valve, when the restoration detector detects that the supply of the power is restored, when the lid sensor detects that the fuel lid is open, and when the speed of the vehicle is higher than or equal to the specified value, and
   the restoration actuator is configured to transmit the command to the actuator to close the sealing valve, when the restoration detector detects that the supply of the power is restored, and the lid sensor detects that the fuel lid is closed.

7. The evaporated fuel processing device according to claim 6, wherein the controller further includes a cut-off detector configured to detect that a supply of power from the battery to the controller is cut off.

\* \* \* \* \*